No. 785,267. PATENTED MAR. 21, 1905.
H. McPHAILL.
BASTING DEVICE.
APPLICATION FILED DEC. 29, 1903.
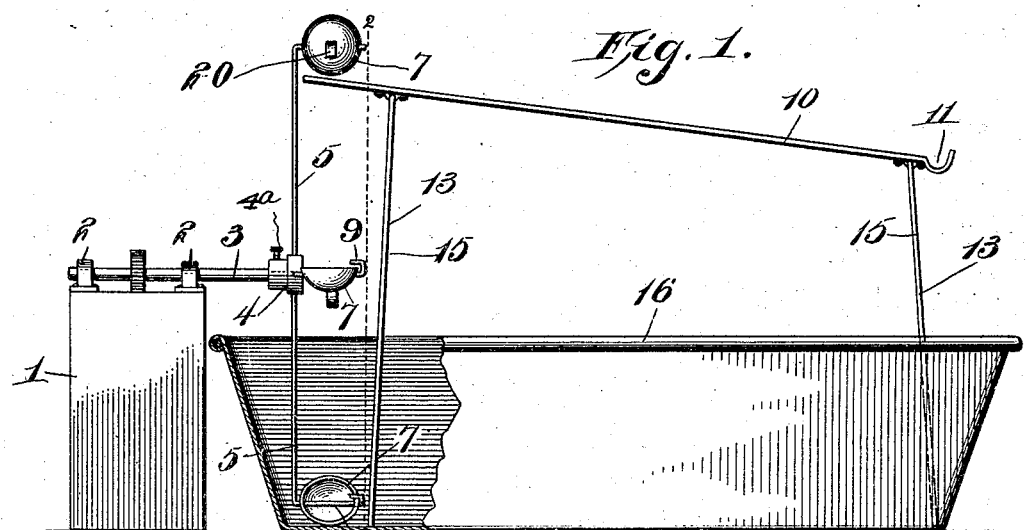
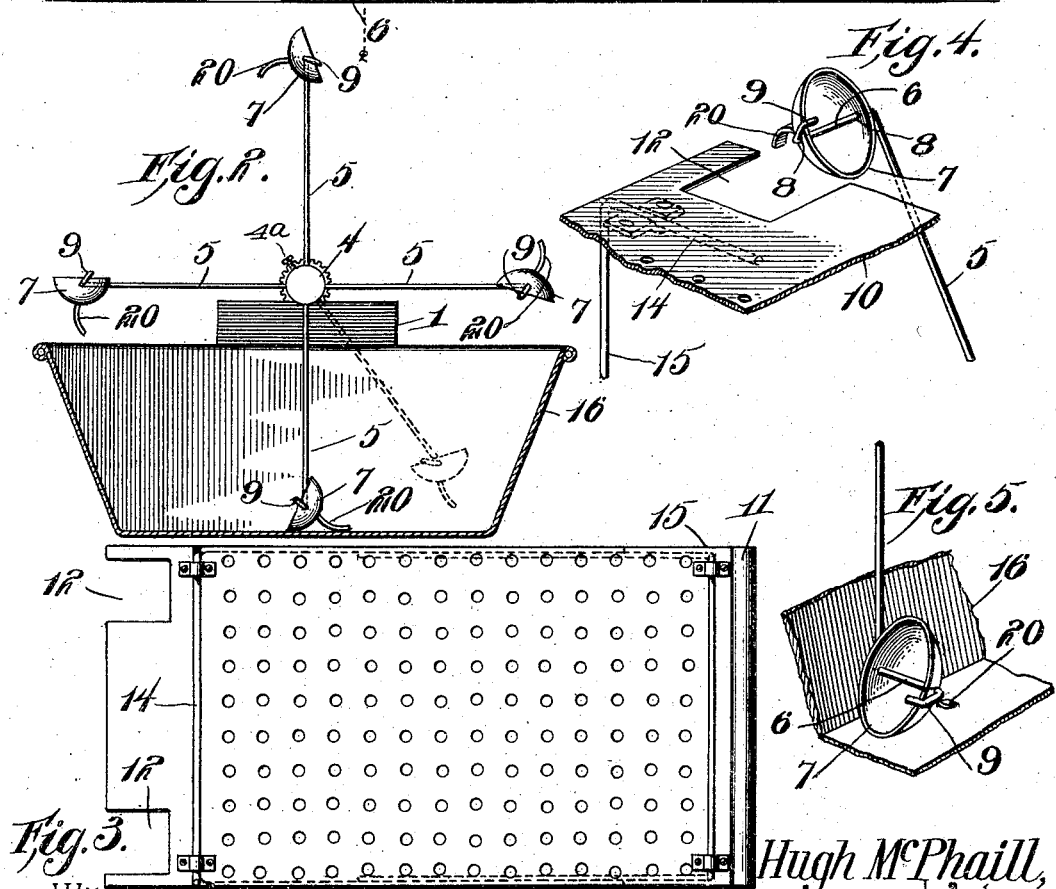
Hugh McPhaill, Inventor.

No. 785,267. Patented March 21, 1905.

UNITED STATES PATENT OFFICE.

HUGH McPHAILL, OF VISALIA, CALIFORNIA.

BASTING DEVICE.

SPECIFICATION forming part of Letters Patent No. 785,267, dated March 21, 1905.

Application filed December 29, 1903. Serial No. 187,008.

*To all whom it may concern:*

Be it known that I, HUGH McPHAILL, a citizen of the United States, residing at Visalia, in the county of Tulare and State of California, have invented a new and useful Basting Device, of which the following is a specification.

This invention relates to devices for automatically basting meat while being roasted, the object being to provide a continuous distribution of the juice and gravy over the roast while the latter is cooking.

The invention consists in the improved construction and arrangement of parts for carrying out the said object, which will be hereinafter described, and particularly pointed out in the claims.

In the accompanying drawings has been shown a simple and preferred form of embodiment of my invention, it being understood that changes and modifications may be made with regard to the size, proportion, and exact manner of assemblage within the scope of my invention and without departing from the spirit or sacrificing the utility of the same.

In said drawings, Figure 1 is a side elevation showing my invention applied to a baking-pan in operative position. Fig. 2 is a transverse sectional view taken on the line 2 2 in Fig. 1. Fig. 3 is an inverted plan view of the spreader or distributer. Fig. 4 is a perspective view illustrating one of the buckets or carriers near the upper limit of its movement and showing its tilted position with relation to the spreader-plate. Fig. 5 is a perspective detail view showing one of the buckets or carriers near the lower limit of its movement and showing its tilted position with relation to the bake-pan.

Corresponding parts in the several figures are indicated by similar numerals of reference.

My improved apparatus is applicable to baking-pans of various sizes and shapes, and it comprises a motor, a revoluble element carrying a plurality of buckets for elevating and discharging the juice from the pan, and a spreader which is to be supported adjustably in the pan. The motor, which has been conventionally indicated at 1, may be of any desired kind and construction. For reasons of economy I prefer to use an ordinary spring-motor, the casing of which supports bearings 2 for a shaft 3, which, with its related parts, constitutes the rotary element of my device. The shaft 3 is provided at one end with a hub 4, secured removably thereon by means of a set-screw $4^a$ and having a plurality of radiating spokes 5, which may consist of ordinary wires, the outer ends of which are bent at right angles to form arms 6, upon which cups or buckets 7 are pivotally mounted. The preferred shape of these buckets, which has been illustrated in the drawings, is semispherical, or approximately so, and they may be easily and at small expense stamped from sheet metal. They are provided on opposite sides with perforations 8, whereby they are pivotally mounted upon the arms 6, as stated. The outer extremities of the arms 6 are bent in the direction of the spokes, as shown at 9, so as to occupy a position above the rims of the buckets when the latter are in a lowered position. It follows that when the device is in operation the bent extremities 9 will constitute tripping devices, by means of which the buckets as they approach the upper limit of their movement are gradually tilted. Each of the buckets is provided on its under side with a curved stem or guide 20, which when the bucket reaches the lower limit of its movement, by contacting with the bottom of the baking-pan in connection with which the device is used, operates to tilt the bucket, so that the latter will readily scoop up the liquid at the bottom of the pan.

10 designates a foraminous plate, which is provided at one end with a transverse depression forming a trough and at its opposite end with recesses 12. Hingedly connected with the under side of said plate are two supporting devices 13, which are preferably bent from wire to form a central portion 14, and legs or supports 15 at each end thereof, said legs being capable of being folded against the foraminous plate when the latter is not in use. The legs of the supporting device 13, adjacent to the end of the plate which has the transverse channel 11, are somewhat shorter than those at the opposite end in order that gravy and juice discharged upon said plate may readily flow in a downward direction, dripping through the openings in the plate upon the roast in the pan in which the device is placed for operation and the surplus being received in the channel 11, from which it will be returned to the pan. It is obvious that the notches or recesses 12 are to be suitably spaced to admit of the passage of the buckets upon the rotary element of the device.

The operation of this invention will be readily understood from the foregoing description taken in connection with the drawings hereto annexed. The foraminous plate is supported in a pan, which has been indicated at 16, by the legs 15, which are placed in said pan. The motor-casing is placed in the position adjacent to said pan, the parts being so proportioned that the buckets when the shaft revolves will pass into contact with the bottom of the pan at the lower limit of their movement, while the notches or recesses 12 are provided for the passage of the buckets above the foraminous plate. When the buckets reach the lower limit of their movement, the guides 20 upon the under sides of said buckets will engage the bottom of the pan, tilting the buckets and causing them to scoop up the gravy and juice in the bottom of the pan. As the buckets ascend they assume a horizontal position until under the trips 9 they are tilted as they reach the upper limit of their movement, thus discharging their contents upon the foraminous plate, with the result already described. While passing the upper limit of their movement the buckets completely turn over and are thus, while descending, gradually restored to their normal horizontal position.

When the device is disassembled for cleaning and storage purposes, the hub carrying the radiating arms and buckets may be detached from the shaft 3 by loosening the set-screw $4^a$, thus enabling the parts to be conveniently cleaned and packed for storage.

Having thus described my invention, I claim—

1. In a basting device, a rotary element having a spoke, an arm extending laterally from one side of said spoke and having a stop, and a tilting bucket mounted upon the said arm with its upper edge in the path of said stop.

2. In a basting device, a rotary element comprising a hub mounted detachably upon a driven shaft and having radiating spokes, arms extending laterally from said spokes, swinging buckets mounted upon said arms and stops formed at the extremities of said arms and extending over the upper edges of the buckets.

In testimony that I claim the foregoing as my own I have hereto affixed my signature in the presence of two witnesses.

HUGH McPHAILL.

Witnesses:
C. C. McAdams,
D. E. Perkins